US010956363B2

United States Patent
Danilov et al.

(10) Patent No.: US 10,956,363 B2
(45) Date of Patent: Mar. 23, 2021

(54) AUTOMATED DATA MANAGEMENT VIA MACHINE-READABLE DATA DEFINITION FILES

(71) Applicant: EMC IP Holding Company LLC, Hopkinton, MA (US)

(72) Inventors: Mikhail Danilov, Saint Petersburg (RU); Stephen J. Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 229 days.

(21) Appl. No.: 15/952,420

(22) Filed: Apr. 13, 2018

(65) Prior Publication Data

US 2019/0318012 A1     Oct. 17, 2019

(51) Int. Cl.
 *G06F 16/11*     (2019.01)
 *G06N 5/02*      (2006.01)

(52) U.S. Cl.
 CPC ........... *G06F 16/122* (2019.01); *G06N 5/022* (2013.01)

(58) Field of Classification Search
 CPC .................................................. G06F 16/122
 See application file for complete search history.

(56) References Cited

U.S. PATENT DOCUMENTS

| | | | | |
|---|---|---|---|---|
| 2005/0065966 | A1* | 3/2005 | Diab | G06F 8/24 |
| 2007/0143739 | A1* | 6/2007 | Taber, III | G06F 9/451 |
| | | | | 717/114 |
| 2016/0103657 | A1* | 4/2016 | Zhang | G06F 21/31 |
| | | | | 726/1 |
| 2017/0006129 | A1* | 1/2017 | Raja | H04L 67/2861 |

OTHER PUBLICATIONS

"InterBase 6—Data Definition Guide", 1999, Borland-InPrise, retrieved from http://www.ibase.ru/files/interbase/ib6/DataDef.pdf Dec. 29, 2019. (Year: 1999).*
Wikipedia, "Infrastructure as Code," https://en.wikipedia.org/wiki/Infrastructure_as_Code#Added_value_and_advantages, Mar. 26, 2018, 4 pages.
seagate.com, "The Digitization of the World From Edge to Core" https://www.seagate.com/files/www-content/our-story/trends/files/idc-seagate-dataage-whitepaper.pdf, 2018, 28 pages.

* cited by examiner

*Primary Examiner* — Sheryl L Holland
(74) *Attorney, Agent, or Firm* — Ryan, Mason & Lewis, LLP (57) ABSTRACT

Techniques are disclosed for automated data management. In one example, a method maintains a set of machine-readable data definition files corresponding to a set of data assets. At least one machine-readable data definition file specifies code for implementing at least one goal state associated with at least one corresponding data asset. The at least one machine-readable data definition file is executed to effectuate the at least one goal state.

20 Claims, 5 Drawing Sheets

150

```
151  id=067e6162-3b6f-4ae2-a171-2470b63dff00       // UUID of the data set
152  owner=54947df8-0e9e-4471-a2f9-9af509fb5889    // UUID of person/organization
153  state=active                                   // current state of the data set
154  location=73af2672-4ae2-4471-0e9e-dff009af509f  // UUID of cloud provider
155  protection=3x                                  // protection scheme, e.g. keep 3 copies
156  quota=777TB                                    // hard-stop quota for the data set size
     ...                                            // etc.
```

FIG. 1A

```
151  id=067e6162-3b6f-4ae2-a171-2470b63dff00          // UUID of the data set
152  owner=54947df8-0e9e-4471-a2f9-9af509fb5889       // UUID of person/organization
153  state=active                                     // current state of the data set
154  location=73af2672-4ae2-4471-0e9e-dff009af509f    // UUID of cloud provider
155  protection=3x                                    // protection scheme, e.g. keep 3 copies
156  quota=777TB                                      // hard-stop quota for the data set size
     ...                                              // etc.
```

FIG. 4 ically well suited for management of large scale data repositories, e.g., zettabytes of storage.

These and other features and advantages of the invention will become more readily apparent from the accompanying drawings and the following detailed description.

AUTOMATED DATA MANAGEMENT VIA MACHINE-READABLE DATA DEFINITION FILES

FIELD

The field relates generally to automated data management and, more particularly, to automated data management via machine-readable data definition files.

BACKGROUND

Utility computing and second-generation web frameworks brought about wide-spread problems for humans managing ever-expanding information technology (IT) infrastructure. The development of infrastructure-as-code (IaC) tools and processes allowed fewer humans to manage a massive collection of infrastructure. IaC is the process of managing and provisioning IT infrastructure associated with, for example, data centers through machine-readable definitions (scripts or declarative definitions), rather than through physical hardware configuration tools. Machine-readable definitions are data (or metadata) in a format that can be easily processed by a computer. Some computer languages for creating machine-readable data have features to improve human readability of the machine-readable data.

The IT infrastructure managed and provisioned by IaC tools and processes may comprise physical processing devices such as bare-metal servers and/or logical processing virtual devices such as virtual machines, as well as associated configuration resources. Thus, the expanding scale of infrastructure has become manageable through IaC by modeling of infrastructure with code followed by execution of the code.

However, such larger automated data centers attract massive amounts of data sets that do not have the same level of automated management as the infrastructure that the data sets reside on. It has been estimated that in less than ten years (e.g., about 2025), the projected size of the so-called datosphere will be about 163 ZB (zettabytes), and the creation of data will shift from consumer-driven to enterprise-driven. Enterprise IT departments must therefore transition from the management of petabytes of storage to zettabytes of storage. The lack of automation for such massive amounts of data will result in significant challenges for enterprises and other entities.

SUMMARY

Embodiments of the invention provide techniques for automated data management.

For example, in one embodiment, a method comprises the following steps. The method maintains a set of machine-readable data definition files corresponding to a set of data assets. At least one machine-readable data definition file specifies code for implementing at least one goal state associated with at least one corresponding data asset. The at least one machine-readable data definition file is executed to effectuate the at least one goal state.

Non-limiting examples of goal states may comprise a data provisioning goal state, a data protection goal state, a data availability goal state, a data regulation goal state, a data quality goal state, a data analytics goal state, a data valuation goal state, and a capacity planning goal state.

Advantageously, illustrative embodiments provide for automated data management of data assets associated with an enterprise. While applicable to data repositories of any size, techniques described herein are particularly well suited for management of large scale data repositories, e.g., zettabytes of storage.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "information processing system," "computing environment," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"metadata" as used herein is intended to be broadly construed, and may comprise, for example, data that describes or defines data;

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"data asset" as used herein is intended to be broadly construed, and may comprise, for example, one or more data items, units, elements, blocks, objects, sets, fields, and the like, combinations thereof, and otherwise any information that is obtained and/or generated by an enterprise;

"enterprise" illustratively refers to an organization, a business, a company, a venture, an entity, or the like; and "entity" illustratively refers to one or more persons, one or more systems, or combinations thereof.

As mentioned above, it is realized that enterprise IT departments, and any entities that have data management responsibilities, will soon need to transition from the management of petabytes of storage to zettabytes of storage. This transition will be a challenge for many reasons, examples of which are as follows:

Manual and Siloed Storage Management Tasks

Storage administrators currently managing large amounts (e.g., petabytes) of storage spend their time manually running management tools and/or creating scripts to do the following tasks:

(i) Data provisioning: allocating and expanding storage;
(ii) Data protection: managing number of copies, availability, restore/repair;
(iii) Data availability: managing permissions, encryption, access, searchability, etc.;
(iv) Data regulation: ensuring data compliance with the ever-shifting compliance environment;
(v) Data quality and analytics: ensuring artificial intelligence (AI) algorithms are effectively leveraging the most appropriate, highest quality data;
(vi) Data Valuation: creating a portfolio of data assets with known value; and
(viii) Capacity planning: predicting data growth and cost for the enterprise.

Given that the tasks described above are often performed manually by humans that are often members of different departments, the time required to manually manage zettabytes of enterprise data will outpace the ability of an enterprise to effectively manage that data.

Cost Inefficiencies

Given the breadth of the data expansion problem described above, enterprises will lack the ability to control storage costs. For example, if an enterprise owns hundreds of thousands of data sets, and the value of those data sets is unknown, it will be impractical if not impossible to control the number of copies that are appropriate for each individual data set based on its value. This will result in an enterprise over-paying for storage capacity.

Execution Time of Storage Administration Tasks

The current size of today's administrative teams will not be able to manually manage hundreds of thousands of data sets. Scaling these teams to effectively manage zettabytes of data is unrealistic from a budget perspective as well as error-prone from a scale perspective.

Regulatory Risk

Zettabyte-size data sets introduce the inevitability of manual error, resulting in violation of corporate, federal, and our global data regulations. This exposure can result in heavy fines being paid by organizations that are not capable of managing massive data set capacities. In addition, attacks against zettabyte-size enterprise data sets can result in additional revenue loss.

Under-Valuation

Enterprises that are unable to manage zettabyte-size data sets frequently will miss windows of opportunities to monetize data. The inability to scale enterprise data valuation algorithms to know which data sets are "hot" (frequently used or accessed) and which data sets are "cold" (not frequently used or accessed) will mean that enterprises will be unable to maximize revenue opportunities enabled by data.

Data Tracking and Auditing

Data sets get altered and moved around all the time. It is difficult to track them while they exist. It is next to impossible to find any audit data after they were deleted.

Illustrative embodiments address the above and other challenges associated with data management of such large-scale data by adapting IaC concepts. As mentioned above, IaC is a method of writing and deploying machine-readable data definition files. The files generate service components that, when executed, support the delivery of business systems and IT-enabled processes. IaC enables IT operations teams to manage and provision IT infrastructure automatically through code without relying on manual processes. IaC concepts result in what is referred to as programmable infrastructure.

More particularly, illustrative embodiments provide for creation and maintenance of a catalog of machine-readable data definition files (DDFs) that describe a goal state of data assets in the enterprise, a mapping of those DDFs to actual data assets, and an execution engine for effectuating these goals via integration with one or more data management application programming interfaces (APIs).

Figure 1A:
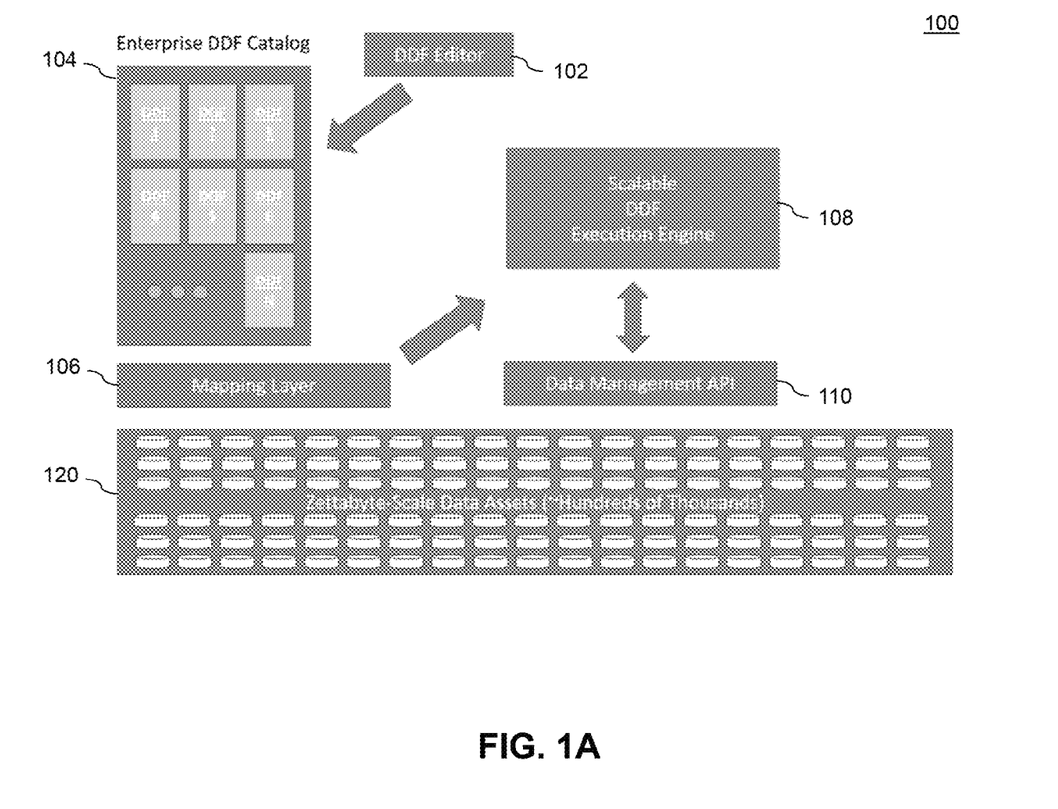
FIG. 1A illustrates an automated data management system environment with an execution engine for machine-readable data definition files with goal states, according to an illustrative embodiment.

FIG. 1A illustrates an automated data management system environment 100 with an execution engine for machine-readable data definition files (DDF) with goal states. As shown, data management system environment 100 comprises a DDF editor 102, an enterprise DDF catalog 104, a DDF mapping layer 106, a scalable DDF execution engine 108, a data management API 110, and data set repository 120 which, in this example, is shown on a zettabyte scale (although embodiments apply to data sets of scales other than zettabytes).

DDF editor 102 allows a developer to create data definition files that comprise goal states for data. A "goal state," as used herein, is a state of a given data set with regard to a certain goal or goals. That is, the developer can create/edit a DDF for a given data set to include one or more goal states such as, by way of example only, goals that address data provisioning (allocating and expanding storage, etc.), data protection (managing number of copies, availability, restore/repair, etc.), data availability (managing permissions, encryption, access, searchability, etc.), data regulation (ensuring data compliance with the ever-shifting compliance environment, etc.), data quality and/or data analytics (ensuring AI algorithms are effectively leveraging the most appropriate, highest quality data, etc.), data valuation (creating a portfolio of data assets with known value, etc.), and capacity planning. For example, a data protection goal state may specify how many protection copies of the given data set are allowed, while a data provisioning goal state may specify what are the maximum budgets for storing the data set in a public cloud platform. One of ordinary skill in the art will realize a wide variety of additional and alternative goal states that can be included in a DDF using DDF editor 102. A non-limiting example of a DDF is further described below in the context of FIG. 1B.

Further, as shown in FIG. 1A, DDF editor 102 interacts with the catalog 104 which stores the DDFs. Additionally or alternatively, the catalog 104 can include pointers to DDFs stored elsewhere in the system environment 100. Interaction with the catalog can include, but is not limited to, the DDF editor 102 triggering execution of a validation layer that implements a set of automatic rules and/or enforces an approval process when updating a DDF (e.g., employing an approval process similar to Bitbucket from Alassian of San Francisco, Calif.). While not expressly shown, such a validation layer is understood to be a part of the editor 102, part of the catalog 104, part of a combination thereof, or part of one or more other components in system environment 100. Having the DDF editor 102 integrate with this type of a system allows for a much richer set of services for managing data.

DDF catalog 104 maintains the DDFs, e.g., DDF 1, DDF 2, DDF 3, . . . DDF N, that are used to manage enterprise data assets. Each data set in the repository 120 can have its own DDF, although in alternative embodiments, one DDF can describe more than one data set, and/or one data set may have more than one DDF (DDF mapping layer 106 maintains the correspondence as will be explained below). DDFs can be added, modified, and deleted to/from the catalog 104 via DDF editor 102. The catalog 104 can be implemented as a version control system (VCS) in order to extend the features of a VCS to data management. For example, a VCS enables tracking of changes in the data sets and comparing two definitions (e.g., previous and current, or perhaps two different but related DDFs). Using a VCS allows an administrator or developer to see what has changed (e.g., data set moved from one cloud platform to another). VCS also allows an administrator to keep track of data sets that were deleted (e.g., audit information such as, by way of example, user, client Internet Protocol (IP) address, reason for deletion, etc.).

DDF mapping layer 106 enables and manages the mapping of DDFs (0-to-many) to actual enterprise data sets in the repository 120. Changes to DDFs and/or new mappings result in the notification of the scalable DDF execution engine 108. It is to be appreciated that DDF mapping layer 106 can be implemented in a variety of ways including, but not limited to, a linked list, a key-value store, etc.

Scalable DDF execution engine 108, in one illustrative embodiment, is a de-centralized engine that is distributed across multiple geographies. The engine 108 monitors all data sets in the repository 120 and executes the necessary code to bring the data sets to the goal state defined in the DDFs. For example, assuming the goal state in a DDF for a given data set is to store no more than 10 copies of the data set for data protection purposes, the DDF execution engine 108 executes code that ensures that such copy limit is enacted and enforced within whatever storage platform or platforms the data set copies are stored. Likewise, if the goal state in the DDF of the given data set is a maximum budget for storing the data set in a public cloud platform, then the DDF execution engine 108 executes code that ensures that such maximum budget is not exceeded, i.e., by monitoring costs of the storage platform currently storing the given data set and, if needed, migrating the given data set to one or more other public cloud platforms that meet the maximum budget (goal state). Monitoring and provisioning/managing of the data assets occurs via the DDF execution engine 108 calling the data management API 110. That is, the API 110 serves as the interface between the engine 108, the data sets in the repository 120, and whatever system is involved in the effectuation of the goal states in the DDFs.

Note that the data set repository 120 may be, in one or more illustrative embodiments, distributed geographically depending on where the given enterprise stores the various data sets that constitute the repository. In fact, one or more other components shown in system environment 100 may be geographically distributed in some embodiments.

Furthermore, as new data assets arrive into the enterprise data portfolio, the DDF mapping layer 106 may use any number of approaches to associate the data asset with a DDF. In one illustrative embodiment, the approach may be inheritance-based (e.g., the incoming data asset inherits a DDF from other assets that are also being generated by a specific application), semantic-based (e.g., the incoming data asset is associated with similar data assets and assumes their DDF), or default-based. Default-based data assets may trigger a review and/or the creation of a new DDF via the DDF editor 102.

Figure 1B:
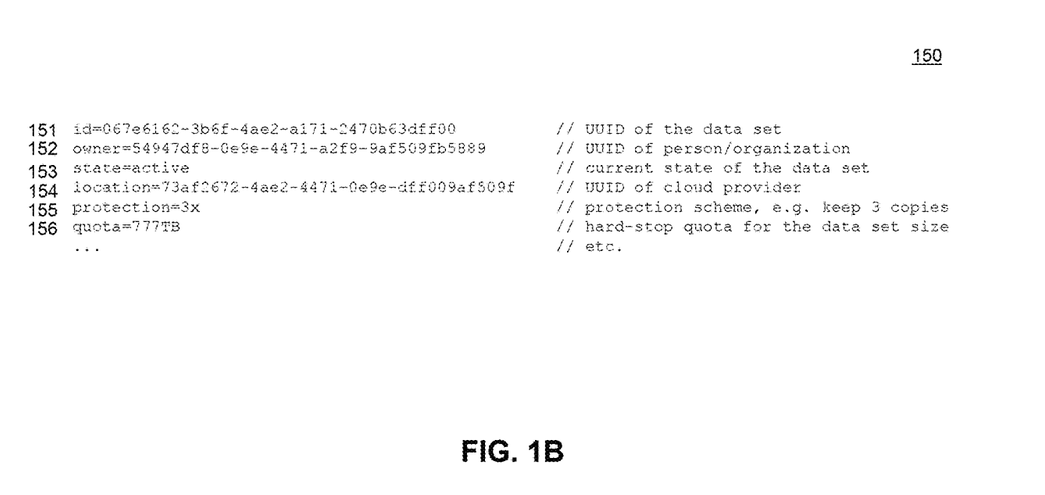
FIG. 1B illustrates an example of a machine-readable data definition file with one or more goal states, according to an illustrative embodiment.

FIG. 1B illustrates an example of a machine-readable data definition file (DDF) 150 according to an illustrative embodiment. As shown in this non-limiting example, DDF 150 comprises the following fields: a universally unique identifier (UUID) 151 for the given data set to which DDF 150 corresponds; a UUID 152 for the owner (person/organization) of the given data set; a state 153 of the given data set (e.g., active); a UUID 154 of the provider of the cloud platform on which the given data set is currently stored; a data protection goal state 155 (e.g., keep three copies); and a data provisioning goal state 156 (e.g., a hard-stop quota for the data set size, in this case, 777 terabytes). Other goal states (not expressly shown) can be included in the DDF 150. Note that the DDF execution engine 108 manages the given data set using the DDF 150 by initiating actions through the API 110 to enforce the goal states 155 and 156, as described above. Furthermore, when data location changes value (field 154 is changed), the engine 108 initiates migration of the given data set.

Figure 2:
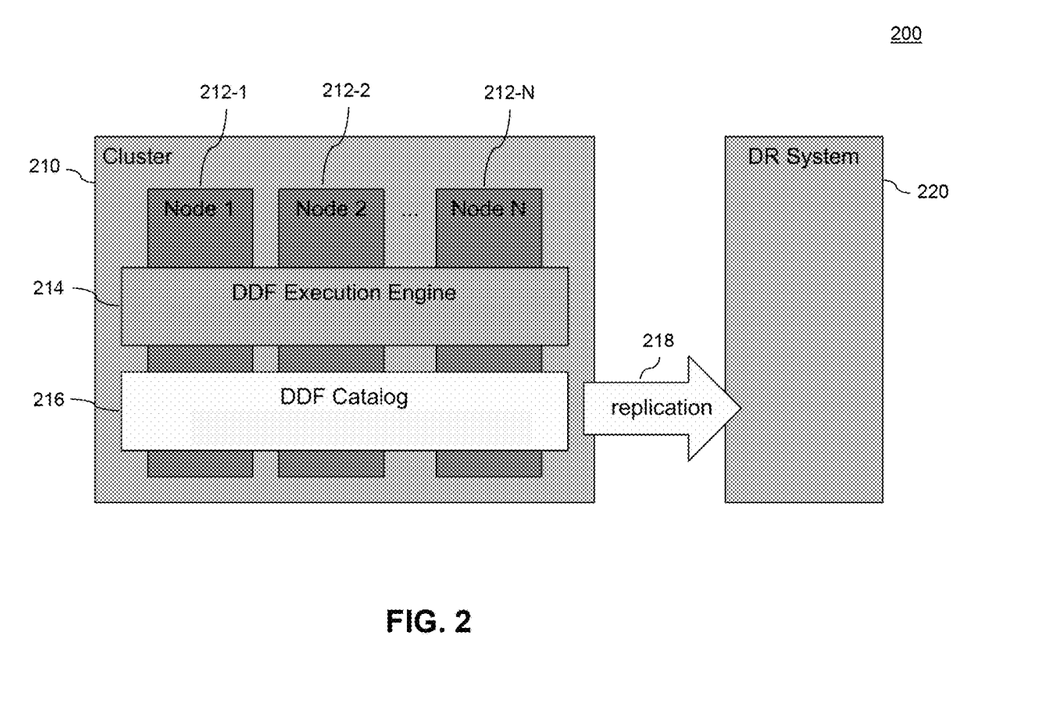
FIG. 2 illustrates a cluster-based implementation of the automated data management system environment of FIG. 1A.

Turning now to FIG. 2, a cluster-based implementation 200 of the automated data management system environment 100 of FIG. 1A is illustrated. It is realized that scalability assurance is a key feature for given implementations. Use of a distributed ledger (for example, blockchain and non-blockchain types including, but not limited to, R3 Corda, Ethereum, MultiChain, and Hyperledger) to store the DDF catalog 104 may be employed in some embodiments. Use of a cluster-based approach as depicted in FIG. 2 is also a practical way to meet data management requirements.

Thus, as shown, the primary (production) data management system 210 resides on a cluster of N processing nodes 212-1, 212-2, . . . 212-N (respectively Node 1, Node 2, . . . Node N). All the nodes or subsets thereof can be used by the scalable DDF execution engine 214 (corresponding to DDF execution engine 108 in FIG. 1A) and the DDF catalog 216 (corresponding to DDF catalog 104 in FIG. 1A). In one or more illustrative embodiments, open-source platforms may be employed for the data management system implementation. For example, in one embodiment, the DDF Catalog 216 may be implemented with Cassandra from the Apache Software Foundation. Apache Cassandra is an open-source distributed NoSQL database management system. Further, in one embodiment, the DDF execution engine 214 may be implemented with Mesos/Marathon from Mesosphere. Marathon is a container orchestration platform for Mesosphere's Datacenter Operating System (DC/OS) and Apache Mesos. Note that DDF editor 102, mapping layer 106, and API 110 of FIG. 1A may be implemented on one or more of the processing nodes 212-1, 212-2, . . . 212-N of the cluster.

Furthermore, as shown in FIG. 2, in order to achieve an even higher level of availability, one or more illustrative embodiments employ replication 218 via a Disaster Recovery (DR) system 220. For example, the content of the DDF Catalog 216 (i.e., the DDFs) may be replicated to the DR system 220 using the Cassandra database management system.

Figure 3:
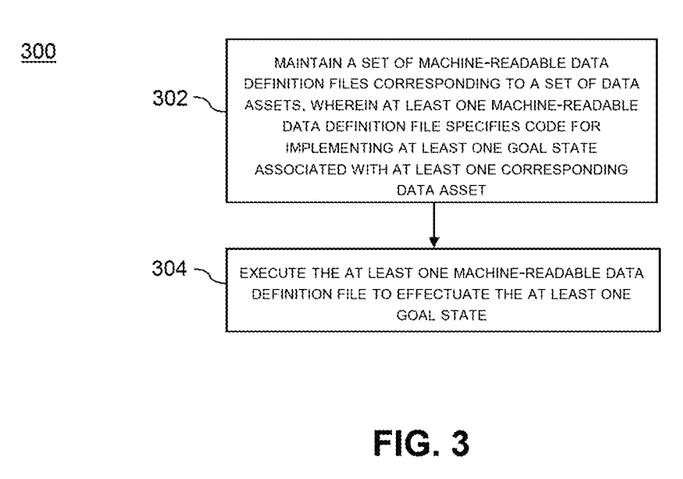
FIG. 3 illustrates an automated data management methodology using machine-readable data definition files with goal states, according to an illustrative embodiment.

FIG. 3 illustrates an automated data management methodology 300 using machine-readable data definition files with goal states, according to an illustrative embodiment. As shown in methodology 300, step 302 maintains a set of machine-readable data definition files corresponding to a set of data assets, wherein at least one machine-readable data definition file specifies code for implementing at least one goal state associated with at least one corresponding data asset. Step 304 executes the at least one machine-readable data definition file to effectuate the at least one goal state.

At least portions of the automated data management system environment shown in FIGS. 1A-3 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the automated data management system environment shown in FIGS. 1A-3 may each run on a computer, server, storage device or other processing platform element. A given such element may be viewed as an example of what is more generally referred to herein as a "processing device." An example of such a processing platform is processing platform 400 shown in FIG. 4.

Figure 4:
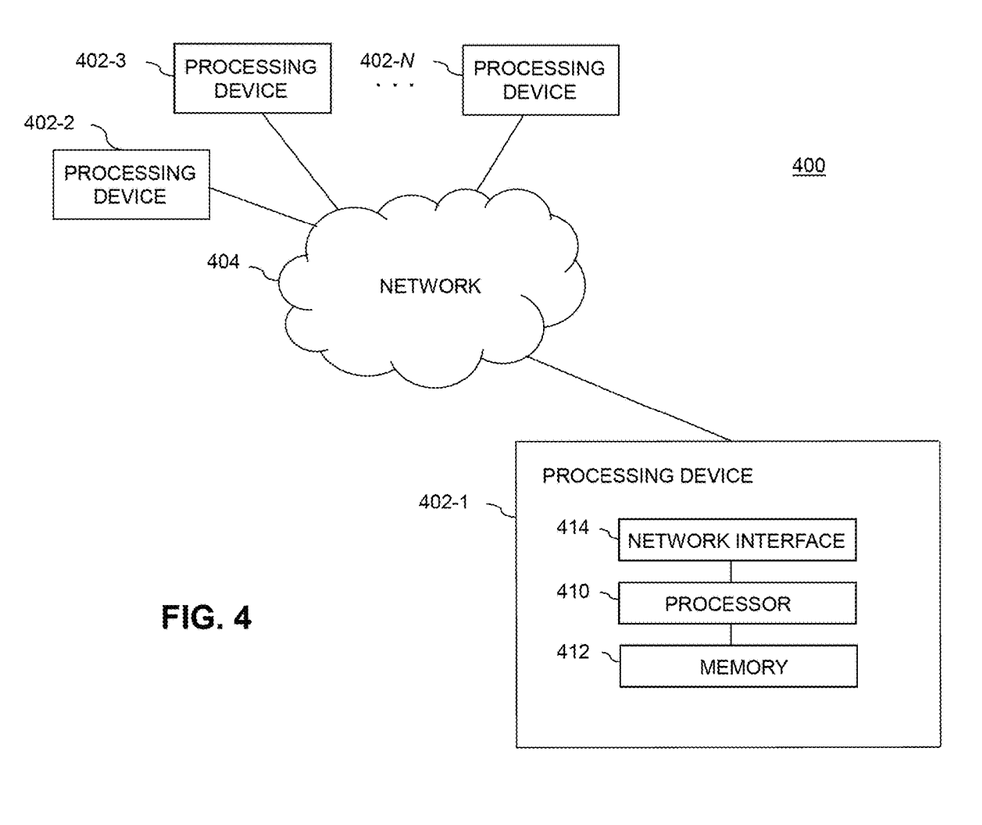
FIG. 4 illustrates a processing platform used to implement an automated data management system environment with an execution engine for machine-readable data definition files with goal states, according to an illustrative embodiment.

The processing platform 400 in this embodiment comprises a plurality of processing devices, denoted 402-1, 402-2, 402-3, . . . 402-N, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA) or other type of processing circuitry, as well as portions or combinations of such circuitry elements.

The memory 412 may comprise random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 of the example embodiment of FIG. 4 is network interface circuitry 414, which is used to interface the processing device with the network 404 and other system components and may comprise conventional transceivers.

The other processing devices 402 of the processing platform 400 are assumed to be configured in a manner similar to that shown for processing device 402-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock™ converged infrastructure commercially available from VCE, the Virtual Computing Environment Company, now the Converged Platform and Solutions Division of Dell EMC. For example, portions of an automated data management system environment of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and methods described herein. Such components can communicate with other elements of the system over any type of network or other communication media.

As indicated previously, in some embodiments, components of the automated data management system environment as disclosed herein can be implemented at least in part in the form of one or more software programs stored in memory and executed by a processor of a processing device. For example, at least portions of the environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems and assets. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method, comprising:
   maintaining a set of machine-readable data definition files corresponding to a set of data assets, wherein at least one machine-readable data definition file specifies code for implementing at least one goal state associated with at least one corresponding data asset; and
   executing the at least one machine-readable data definition file to effectuate the at least one goal state;
   wherein the at least one goal state represents one or more intended goals associated with managing the at least one corresponding data set;
   wherein the step of executing includes monitoring the at least one corresponding data asset with an execution engine, the execution engine coupled to the set of machine-readable data definition files and having code configured to initiate one or more actions to enforce the at least one goal state;
   wherein the at least one goal state comprises a data provisioning goal state and a data protection goal state and at least one of a data availability goal state, a data regulation goal state, a data quality goal state, a data analytics goal state, a data valuation goal state, and a capacity planning goal state;
   wherein each machine-readable data definition file comprises unique identifiers corresponding to a respective given data asset of the data assets and an enterprise associated with the given data asset and at least one additional unique identifier corresponding to at least one of a state of the given data asset and a location of the given data asset; and
   wherein the maintaining and executing steps are implemented via at least one processing device comprising a processor and a memory.

2. The method of claim 1, further comprising maintaining a mapping between the set of machine-readable data definition files and the set of data assets.

3. The method of claim 1, further comprising editing of the set of machine-readable data definition files.

4. The method of claim 3, wherein the step of editing the set of machine-readable data definition files further comprises, upon the addition of one or more new data assets to the set of data assets, creating one or more new machine-readable data definition files and adding the one or more new machine-readable data definition files to the set of machine-readable data definition files.

5. The method of claim 3, wherein the step of editing the set of machine-readable data definition files further comprises, upon the deletion of one or more existing data assets from the set of data assets, deleting one or more existing machine-readable data definition files in the set of machine-readable data definition files.

6. The method of claim 3, wherein the step of editing the set of machine-readable data definition files further comprises, upon the modification of one or more existing data assets in the set of data assets, modifying one or more existing machine-readable data definition files in the set of machine-readable data definition files.

7. The method of claim 3, wherein the step of editing the set of machine-readable data definition files further comprises validating one or more edits to the set of machine-readable data definition files before the one or more edits are implemented.

8. The method of claim 1, further comprising the step of one or more new data assets added to the set of data assets inheriting one or more existing machine-readable data definition files.

9. The method of claim 1, further comprising the step of one or more new data assets added to the set of data assets assuming one or more existing machine-readable data definition files.

10. The method of claim 1, wherein the step of maintaining the set of machine-readable data definition files further comprises maintaining version control data for the set of machine-readable data definition files.

11. The method of claim 1, wherein the step of executing the at least one machine-readable data definition file to effectuate the at least one goal state further comprises utilizing one or more application programming interfaces to effectuate the at least one goal state upon execution of the at least one machine-readable data definition file, the one or more application programming interfaces integrated with the execution engine and actuated in response to a request from the execution engine.

12. The method of claim 1, wherein the code for at least one machine-readable data definition file further specifies code for enabling infrastructure for one of storing and processing at least one corresponding data asset.

13. An article of manufacture comprising a non-transitory processor-readable storage medium having encoded therein executable code of one or more software programs, wherein the one or more software programs when executed by one or more processing devices implement the steps of:
   maintaining a set of machine-readable data definition files corresponding to a set of data assets, wherein at least one machine-readable data definition file specifies code for implementing at least one goal state associated with at least one corresponding data asset; and
   executing the at least one machine-readable data definition file to effectuate the at least one goal state;
   wherein the at least one goal state represents one or more intended goals associated with managing the at least one corresponding data set;
   wherein the step of executing includes monitoring the at least one corresponding data asset with an execution engine, the execution engine coupled to the set of machine-readable data definition files and having code configured to initiate one or more actions to enforce the at least one goal state;

wherein the at least one goal state comprises a data provisioning goal state and a data protection goal state and at least one of a data availability goal state, a data regulation goal state, a data quality goal state, a data analytics goal state, a data valuation goal state, and a capacity planning goal state; and wherein each machine-readable data definition file comprises unique identifiers corresponding to a respective given data asset of the data assets and an enterprise associated with the given data asset and at least one additional unique identifier corresponding to at least one of a state of the given data asset and a location of the given data asset.

14. A system comprising:

one or more processors operatively coupled to one or more memories configured to:

maintain a set of machine-readable data definition files corresponding to a set of data assets, wherein at least one machine-readable data definition file specifies code for implementing at least one goal state associated with at least one corresponding data asset; and execute the at least one machine-readable data definition file to effectuate the at least one goal state;

wherein the at least one goal state represents one or more intended goals associated with managing the at least one corresponding data set;

wherein executing includes monitoring the at least one corresponding data asset with an execution engine, the execution engine coupled to the set of machine-readable data definition files and having code configured to initiate one or more actions to enforce the at least one goal state;

wherein the at least one goal state comprises a data provisioning goal state and a data protection goal state and at least one of a data availability goal state, a data regulation goal state, a data quality goal state, a data analytics goal state, a data valuation goal state, and a capacity planning goal state; and wherein each machine-readable data definition file comprises unique identifiers corresponding to a respective given data asset of the data assets and an enterprise associated with the given data asset and at least one additional unique identifier corresponding to at least one of a state of the given data asset and a location of the given data asset.

15. The system of claim 14, wherein the one or more processors are further configured to maintain a mapping between the set of machine-readable data definition files and the set of data assets.

16. The system of claim 14, wherein the one or more processors are further configured to edit the set of machine-readable data definition files.

17. The system of claim 14, wherein the one or more processors are further configured to maintain version control data for the set of machine-readable data definition files.

18. The system of claim 14, wherein the one or more processors are further configured to utilize one or more application programming interfaces to effectuate the at least one goal state upon execution of the at least one machine-readable data definition file, the one or more application programming interfaces integrated with the execution engine and actuated in response to a request from the execution engine.

19. The article of manufacture of claim 13 wherein editing the set of machine-readable data definition files further comprises at least one of the following:

upon the addition of one or more new data assets to the set of data assets, creating one or more new machine-readable data definition files and adding the one or more new machine-readable data definition files to the set of machine-readable data definition files;

upon the deletion of one or more existing data assets from the set of data assets, deleting one or more existing machine-readable data definition files in the set of machine-readable data definition files; and upon the modification of one or more existing data assets in the set of data assets, modifying one or more existing machine-readable data definition files in the set of machine-readable data definition files.

20. The system of claim 14 wherein editing the set of machine-readable data definition files further comprises at least one of the following:

upon the addition of one or more new data assets to the set of data assets, creating one or more new machine-readable data definition files and adding the one or more new machine-readable data definition files to the set of machine-readable data definition files;

upon the deletion of one or more existing data assets from the set of data assets, deleting one or more existing machine-readable data definition files in the set of machine-readable data definition files; and upon the modification of one or more existing data assets in the set of data assets, modifying one or more existing machine-readable data definition files in the set of machine-readable data definition files.

* * * * *